United States Patent
Kang et al.

(10) Patent No.: US 7,800,730 B2
(45) Date of Patent: Sep. 21, 2010

(54) LIQUID CRYSTAL DISPLAY DEVICE

(75) Inventors: Koo-Won Kang, Gyeongsangbuk-do (KR); Gun-Woo Do, Gyeongsangbuk-do (KR); Sang-Chul Jung, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 133 days.

(21) Appl. No.: 12/318,264

(22) Filed: Dec. 23, 2008

(65) Prior Publication Data

US 2009/0310057 A1 Dec. 17, 2009

(30) Foreign Application Priority Data

Jun. 13, 2008 (KR) .................. 10-2008-0055535

(51) Int. Cl.
*G02F 1/1345* (2006.01)
(52) U.S. Cl. .................. 349/149; 349/58; 349/152
(58) Field of Classification Search .......... 349/56–59, 349/149–152
See application file for complete search history.

(56) References Cited

U.S. PATENT DOCUMENTS

| 2006/0098134 A1* | 5/2006 | Park et al. ............. 349/58 |
| 2009/0201438 A1* | 8/2009 | Kim et al. ............. 349/58 |
| 2010/0149453 A1* | 6/2010 | Lee et al. ............. 349/58 |

* cited by examiner

*Primary Examiner*—Hemang Sanghavi
(74) *Attorney, Agent, or Firm*—Morgan Lewis & Bockius LLP

(57) ABSTRACT

A liquid crystal display device includes a cover bottom, a support main over the cover bottom, a backlight unit surrounded by the support main, a liquid crystal panel over the backlight unit and including first and second substrates with a liquid crystal layer interposed therebetween, a driving circuit on an edge portion of the first substrate, a printed circuit board connected to the driving circuit through a connection means and bent toward one of a side surface of the support main and a rear surface of the cover bottom, and an adhesive tape covering edges of a front surface of the liquid crystal panel and including a conductive layer contacting the liquid crystal panel and the driving circuit, wherein the conductive layer is electrically connected to one of the cover bottom and the printed circuit board.

10 Claims, 4 Drawing Sheets

LIQUID CRYSTAL DISPLAY DEVICE

This application claims the benefit of Korean Patent Application No. 10-2008-0055535, filed in Korea on Jun. 13, 2008, which is hereby incorporated by reference for all purposes as if fully set forth herein.

BACKGROUND OF THE INVENTION

1. Field of the Invention

The invention relates to a liquid crystal display device, and more particularly, to a liquid crystal display device having a thin thickness and light weight.

2. Discussion of the Related Art

With the rapid development of information technology, flat panel display (FPD) devices, such as liquid crystal display (LCD) devices, plasma display panels (PDPs), electroluminescent display (ELD) devices and field emission display (FED) devices, have been developed and have replaced cathode ray tubes (CRTs) because of their thin thickness, light weight, and low power consumption.

Among these devices, liquid crystal display (LCD) devices widely used for monitors of notebook computers, monitors of personal computers and as displays for televisions because the LCD devices are excellent at displaying moving images and have a high contrast ratio.

LCD devices are not self-luminescent and require an additional light source. By disposing a backlight unit at the rear side of a liquid crystal panel to emit light into the liquid crystal panel, discernible images can be displayed. Backlight units may include cold cathode fluorescent lamps (CCFLs), external electrode fluorescent lamps (EEFLs) or light-emitting diodes (LEDs) as a light source.

Recently, the LEDs are widely used as a light source for a display device because of their small sizes, low power consumption and high reliability.

FIG. 1 is a cross-sectional view illustrating a liquid crystal display (LCD) module including LEDs as a light source according to the related art.

In FIG. 1, the related art LCD module includes a liquid crystal panel 10, a backlight unit 20, a support main 30, a top cover 40 and a cover bottom 50. The liquid crystal panel 10 displays images and includes first and second substrates 12 and 14 attached with a liquid crystal layer (not shown) interposed therebetween.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at an edge of at least one side of the support main 30 along a length direction. The reflection sheet 25 is disposed over the cover bottom 50 and is white- or silver-colored. The light guide plate 23 is disposed over the reflection sheet 25. The plurality of optical sheets 21 are disposed over the light guide plate 23.

More particularly, the LED assembly 29 is disposed at a side of the light guide plate 23. The LED assembly 29 includes a plurality of LEDs 29a and a flexible printed circuit board (FPCB) 29b on which the LEDs 29a are planted.

Side surfaces of the liquid crystal panel 10 and the backlight unit 20 are surrounded by the support main 30 having a rectangular frame shape. The top cover 40 covers edges of a front surface of the liquid crystal panel 10, and the cover bottom 50 covers a rear surface of the backlight unit 20. The top cover 40 and the cover bottom 50 are combined with the support main 30 to thereby constitute one-united body.

Lights emitted from the LEDs 29a are incident on the side surface of the light guide plate 23 and are refracted toward the liquid crystal panel 10. The lights are changed to have uniform brightness and high qualities through the plurality of optical sheets 21 and are provided to the liquid crystal panel 10. Accordingly, the liquid crystal panel 10 displays images.

Meanwhile, the LCD device is widely used for monitors of desktop computers or wall mounted televisions as well as portable computers. Studies for an LCD device with remarkably reduced weight and size while having a large display area have been actively made.

However, since the LCD device includes lots of elements, it is limited to reduce a thickness and a weight of an LCD device. In addition, it is easy that unnecessary electric charges such as static electricity flow into the LCD device, and this affects the arrangement of liquid crystal molecules (not shown) in the liquid crystal panel 10 and do damage to a normal operation. Accordingly, image qualities are lowered.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device that has a thin thickness and light weight.

Another advantage of the present invention is to provide a liquid crystal display device that easily removes unnecessary charges.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a cover bottom, a support main over the cover bottom, a backlight unit surrounded by the support main, a liquid crystal panel over the backlight unit and including first and second substrates with a liquid crystal layer interposed therebetween, a driving circuit on an edge portion of the first substrate, a printed circuit board connected to the driving circuit through a connection means and bent toward one of a side surface of the support main and a rear surface of the cover bottom, and an adhesive tape covering edges of a front surface of the liquid crystal panel and including a conductive layer contacting the liquid crystal panel and the driving circuit, wherein the conductive layer is electrically connected to one of the cover bottom and the printed circuit board.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 2:
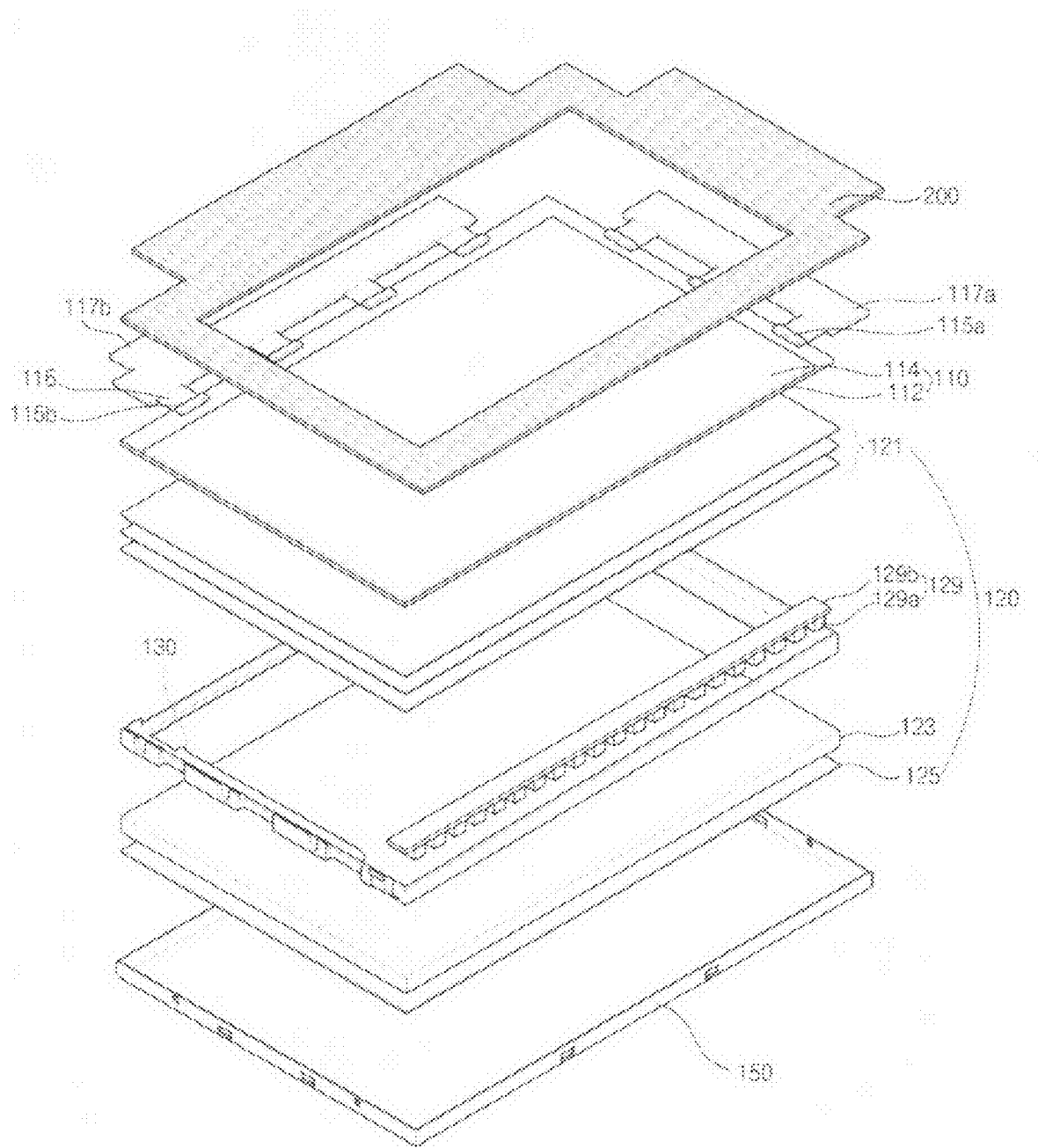
FIG. 2 is an exploded perspective view of an LCD module according to an exemplary embodiment of the present invention.

FIG. 2 is an exploded perspective view of an LCD module according to an exemplary embodiment of the present invention.

In FIG. 2, an LCD module includes a liquid crystal panel 110, a backlight unit 120, a support main 130, a cover bottom 150 and an adhesive tape 200.

More particularly, the liquid crystal panel 110 displays images. The liquid crystal panel 110 includes first and second substrates 112 and 114 facing and attached to each other with a liquid crystal layer interposed therebetween. In an active matrix-type, although shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns corresponding to the pixel regions, respectively. The black matrix surrounds each of the color filter patterns and covers the gate lines, the data lines, and the thin film transistors. A transparent common electrode is formed over the color filter patterns and the black matrix.

The first substrate 112 has a larger size than the second substrate 114 because the first substrate 112 further includes pad areas as compared with the second substrate 114, and the pad areas, which are two edge portions of the first substrate 112 adjacent to each other, are exposed. Driving circuits 115a and 115b for providing signals to the gate lines and the data lines are disposed in the pad areas. The driving circuits 115a and 115b may have upper surfaces that are treated with synthetic pigments of copper or carbon and are used for screening static electricity.

The liquid crystal panel 110 having the above-stated structure may be referred to as a chip on glass (COG) type liquid crystal panel, in which the driving circuits 115a and 115b are directly attached on the first substrate 112 using an anisotropic conductive film (ACF). The COG type liquid crystal panel increases an occupation ratio of the liquid crystal panel in the LCD device.

The driving circuits 115a and 115b are gate driving circuits and data driving circuits, respectively. The gate driving circuits 115a are connected to the gate lines on the first substrate 112, and the data circuits 116b are connected to the data lines on the first substrate 112.

The gate and data driving circuit 115a and 115b are connected to gate and data printed circuit boards 117a and 117b through connection means 116, respectively. The gate and data printed circuit boards 117a and 117b are electrically connected to each other. Here, the gate printed circuit board 117a may be omitted, and in this case, the gate driving circuits 115a may be directly connected to the data printed circuit board 117b.

The gate and data printed circuit boards 117a and 117b are bent toward a side surface of the support main 130 or a rear surface of the cover bottom 150 during a module process.

Although not shown in the figure, upper and lower alignment layers are interposed between the second substrate 114 and the liquid crystal layer and between the first substrate 112 and the liquid crystal layer, respectively. A seal pattern is formed along edge portions between the first and second substrates 112 and 114 to prevent liquid crystal materials of the liquid crystal layer from leaking.

Polarizers (not shown) are disposed at outer surfaces of the first and second substrates 112 and 114, respectively.

The thin film transistors are selected by each gate line and turn on according to scan signals transferred through the gate lines, and data signals are provided to the pixel electrodes through the data lines. According to this, an electric field is induced between the pixel electrodes and the common electrode, and the arrangement of the liquid crystal molecules is changed by the electric field to change transmittance. Therefore, the liquid crystal panel 110 displays variances in the transmittance as images.

The backlight unit 120 is disposed under and provides light to the liquid crystal panel 110 so that variances in transmittance of the liquid crystal panel 110 are shown to the outside.

The backlight unit 120 includes a light-emitting diode (LED) assembly 129, a reflection sheet 125 of a white or silver color, a light guide plate 123 over the reflection sheet 125, and optical sheets 121 over the light guide plate 123.

The LED assembly 129 is disposed at a side of the light guide plate 123, on which light is incident, such that the LED assembly 129 faces the side of the light guide plate 123. The LED assembly 129 includes a plurality of LEDs 129a and a flexible printed circuit board (FPCB) 129b, on which the LEDs 129a are planted to be spaced apart from each other.

The LEDs 129a include red (R), green (G) and blue (B) LEDs respectively emitting red, green and blue lights toward the side of the light guide plate 123. A white light is produced by lighting the RGB LEDs 129a up at a time and by mixing the red, green and blue lights.

Each of the LEDs 129a may include an LED chip emitting red, green and blue lights, and each LED 129a may produce a white light. The LED 129a may include a chip emitting a white light and emit a full white light.

Meanwhile, the LEDs 129a respectively emitting red, green and blue lights may be mounted as a cluster, and the plurality of LEDs 129a may be arranged on the FPCB 129b in a line or in several lines.

In addition to the LEDs 129a, fluorescent lamps such as external electrode fluorescent lamps or cold cathode fluorescent lamps may be used as a light source of the backlight unit 120.

The light guide plate 123 totally reflects lights emitted from the LEDs 129a several times such that the lights move through the inside of the light guide plate 123 and are uniformly scattered. Accordingly, an initial flat light source is provided to the liquid crystal panel 110. To provide a uniform flat light source, the light guide plate 123 may include predetermined patterns at its rear surface.

The reflection sheet 125 is disposed under the rear surface of the light guide plate 123. The reflection sheet 125 reflects lights passing through the rear surface of the light guide plate 123 toward the liquid crystal panel 110 to increase the brightness.

The optical sheets 121 over the light guide plate 123 include a diffuser sheet and at least one light-concentrating sheet. The optical sheets 121 diffuse or concentrate lights passing through the light guide plate 123 such that more uniform flat light source is provided to the liquid crystal panel 110.

The liquid crystal panel 110 and the backlight unit 120 may be combined together by the support main 130, the cover bottom 150 and the adhesive tape 200 to constitute a liquid crystal display module. Here, the support main 130 has a rectangular frame shape surrounding edges of the liquid crystal panel 110 and the backlight unit 120.

The cover bottom 150 combined with the support main 130 has a rectangular plate shape, and four edges of the cover bottom 150 are bent perpendicularly toward the liquid crystal panel 110 such that the liquid crystal panel 110 and the backlight unit 120 are disposed in and over cover bottom 150.

The support main 130 may be referred to as a guide panel, a main support or a mold frame, and the cover bottom 150 may be referred to as a bottom cover or a lower cover.

The adhesive tape 200 covers four side surfaces and four edges of an upper surface of the liquid crystal panel 110 and exposes a front surface of the liquid crystal panel 110 such that images displayed by the liquid crystal panel 110 are shown.

The adhesive tape 200 extends to side surfaces of the support main 130, and the liquid crystal panel 110, the support main 130 and the cover bottom 150 are combined together by the adhesive tape 200 to constitute one-united module.

That is, the edges of the liquid crystal panel 110 and the backlight unit 120 are surrounded by the support main 130, and the backlight unit 120 is prevented from being detached from the module by the cover bottom 150.

In addition, the adhesive tape 200 covers the four side surfaces and the four edges of the upper surface of the liquid crystal panel 110 and prevents the liquid crystal panel 110 from being detached from the module.

Figure 1:
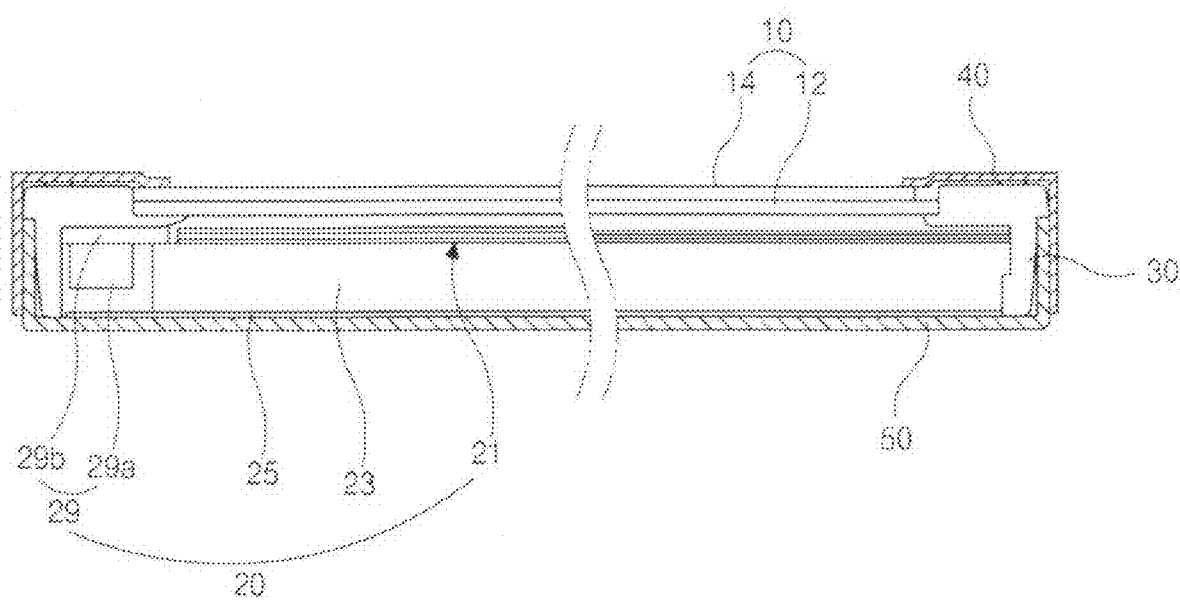
FIG. 1 is a cross-sectional view illustrating a liquid crystal display (LCD) module including LEDs as a light source according to the related art.

The adhesive tape 200 functions as a top cover 40 of FIG. 1 of the related art. In the present invention, since the top cover is omitted, the liquid crystal display module can have a thin thickness. Additionally, the process is simplified, and it is easy to reassemble the module. Moreover, since the top cover of a metallic material is eliminated, process costs can be reduced.

In the meantime, the liquid crystal panel 110 and the driving circuits 115a and 115b are grounded by the adhesive tape 200 that is attached to the two edge portions of the liquid crystal panel 110, which are adjacent to each other and in which the driving circuits 115a and 115b are disposed, and thus the static electricity can be removed. This will be described in more detail with reference to accompanying drawings.

Figure 3A:
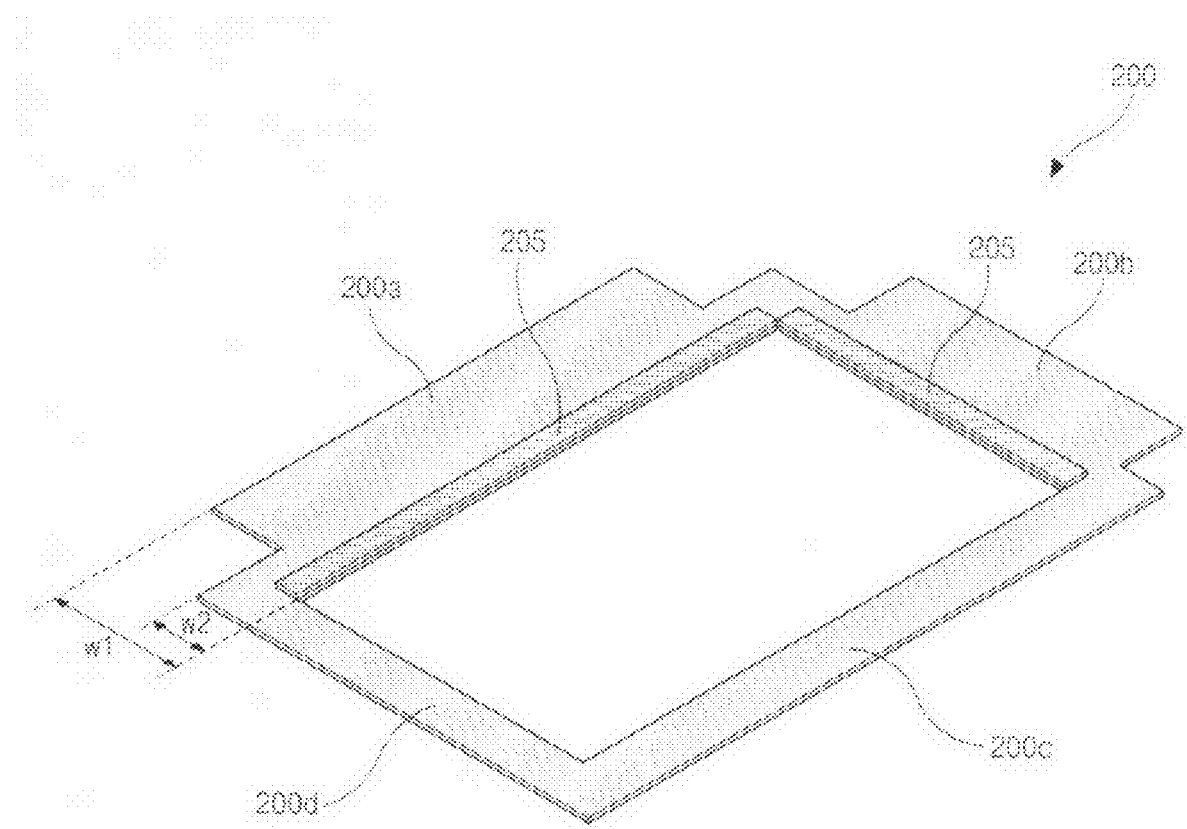
FIGS. 3A and 3B are perspective views schematically illustrating a structure of an adhesive tape according to the exemplary embodiment of the present invention.
Figure 3B:
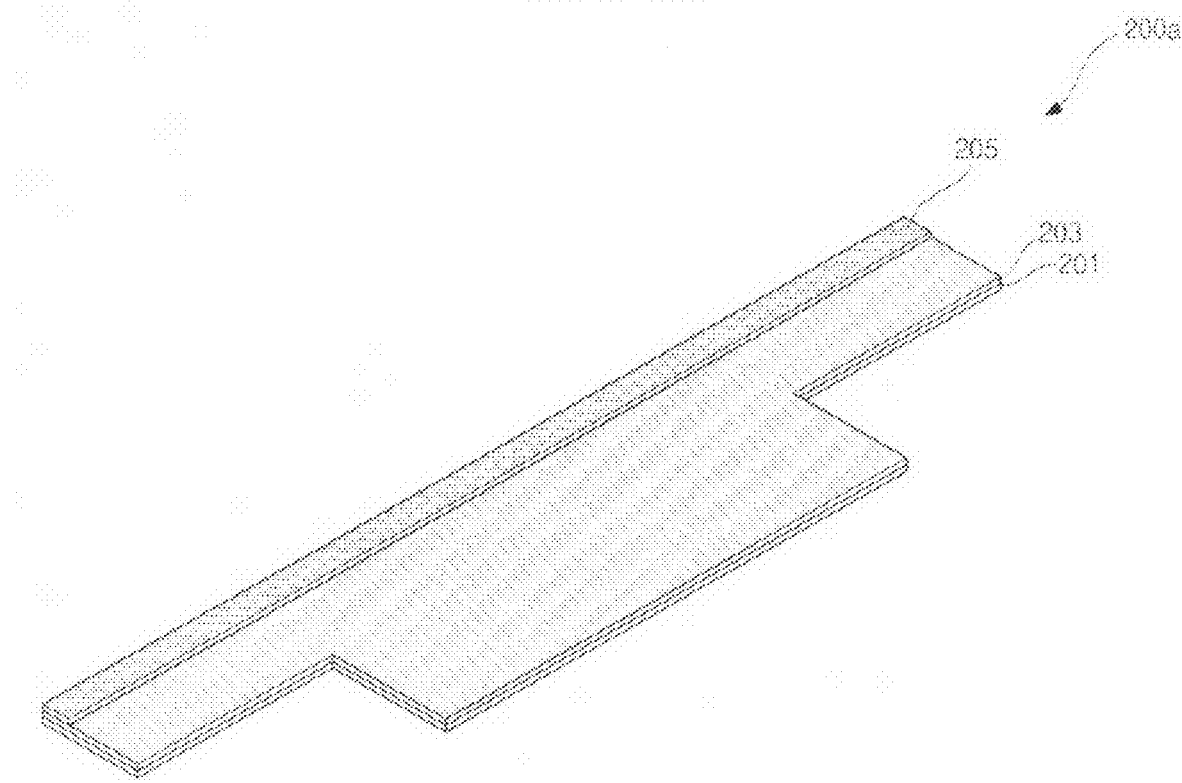

FIGS. 3A and 3B are perspective views schematically illustrating a structure of an adhesive tape according to the exemplary embodiment of the present invention.

In FIG. 3A, the adhesive tape 200 has a rectangular frame shape. The adhesive tape 200 includes first, second, third and fourth parts 200a, 200b, 200c and 200d. The first part 200a corresponds to the data printed circuit board 117b of FIG. 2, and the second part 200b corresponds to the gate printed circuit board 117a of FIG. 2. The third part 200c is opposite to and faces the first part 200a, and the fourth part 200d is opposite to and faces the second part 200b.

The first, second, third and fourth parts 200a, 200b, 200c and 200d of the adhesive tape 200 have a width w2 such that the first, second, third and fourth parts 200a, 200b, 200c and 200d cover the side surfaces and edges of the upper surface of the liquid crystal panel 110 of FIG. 2. The first and second parts 200a and 200b corresponding to the gate and data printed circuit boards 117a and 117b of FIG. 2 of the liquid crystal panel 110 of FIG. 2 partially have a width w1 wider than the width w2. Accordingly, the first and second parts 200a and 200b are partially wider than the third and fourth parts 200c and 200d. This is to cover and protect the gate and data printed circuit boards 117a and 117b of FIG. 2, which are connected to the driving circuits 115a and 115b of FIG. 2 through the connection means 116 of FIG. 2 and are bent toward a side surface of the support main 130 of FIG. 2 or a rear surface of the cover bottom 150 of FIG. 2 during a module assembly process.

Accordingly, the third and fourth parts 200c and 200d have the width w2, which is able to cover some edges of the upper surface and some side surfaces of liquid crystal panel 110 of FIG. 2 and some side surfaces of the support main 130 of FIG. 2 in the module. The first and second parts 220a and 220b partially have the width w1, which extend onto the rear surface of the cover bottom 150 of FIG. 2 and is able to cover other edges of the upper surface and other side surfaces of liquid crystal panel 110 of FIG. 2 and other side surfaces of the support main 130 of FIG. 2 in the module and to cover the gate and data printed circuit boards 117a and 117b of FIG. 2 disposed on the rear surface of the cover bottom 150 of FIG. 2.

Here, the gate printed circuit board 117a may be omitted, and at this time, the second part 200b of the adhesive tape 200 may have the same width of the third and fourth parts 200c and 200d.

Meanwhile, a conductive metallic layer 205 is formed on each of the first and second parts 200a and 200b.

Referring to FIG. 3B showing the first part of the adhesive tape, the first part 200a has substantially a bar shape. The first part 200a includes a base film 201 of a polyethylene terephthalate (PET) resin and an adhesive material layer 203. Further, a conductive metallic layer 205 is formed on the adhesive material layer 203 along a length direction of the first part 200a. The conductive metallic layer 205 is disposed on an inward edge of the first part 200a and is formed of a conductive material such as aluminum (Al). The second part 200b has the same structure as the first part 200a.

The first and second parts 200a and 200b of the adhesive tape 200 are attached at two edge portions of the liquid crystal panel 110, which are adjacent to each other and in which the driving circuits 115a and 115b are disposed. At this time, the conductive metallic layers 205 of the first and second parts 200a and 200b have a wider width than those of the driving circuits 115a and 115b of FIG. 2 disposed in the pad areas of the liquid crystal panel 110 of FIG. 2. The conductive metallic layers 205 of the first and second parts 200a and 200b completely cover the upper surfaces of the driving circuits 115a and 115b of FIG. 2 and partially contact the edge portions of the liquid crystal panel 110 of FIG. 2.

Accordingly, the conductive metallic layers 205 of the first and second parts 200a and 200b contact the liquid crystal panel 110 of FIG. 2 and also contact the upper surfaces of the driving circuits 115a and 115b of FIG. 2, and the liquid crystal panel 110 of FIG. 2 and the driving circuits 115a and 115b of FIG. 2 is grounded to the outside through the conductive metallic layer 205 of the adhesive tape 200 to remove the static electricity created in the liquid crystal panel 110 of FIG. 2 and the driving circuits 115a and 115b of FIG. 2.

Here, the outside may be the cover bottom 150 of FIG. 2 having a ground potential or the printed circuit boards 117a and 117b of FIG. 2 including ground pads (not shown). Unnecessary charges such as the static electricity created in the liquid crystal panel 110 of FIG. 2 and the driving circuits 115a and 115b of FIG. 2 are easily discharged and removed.

Figure 4A:
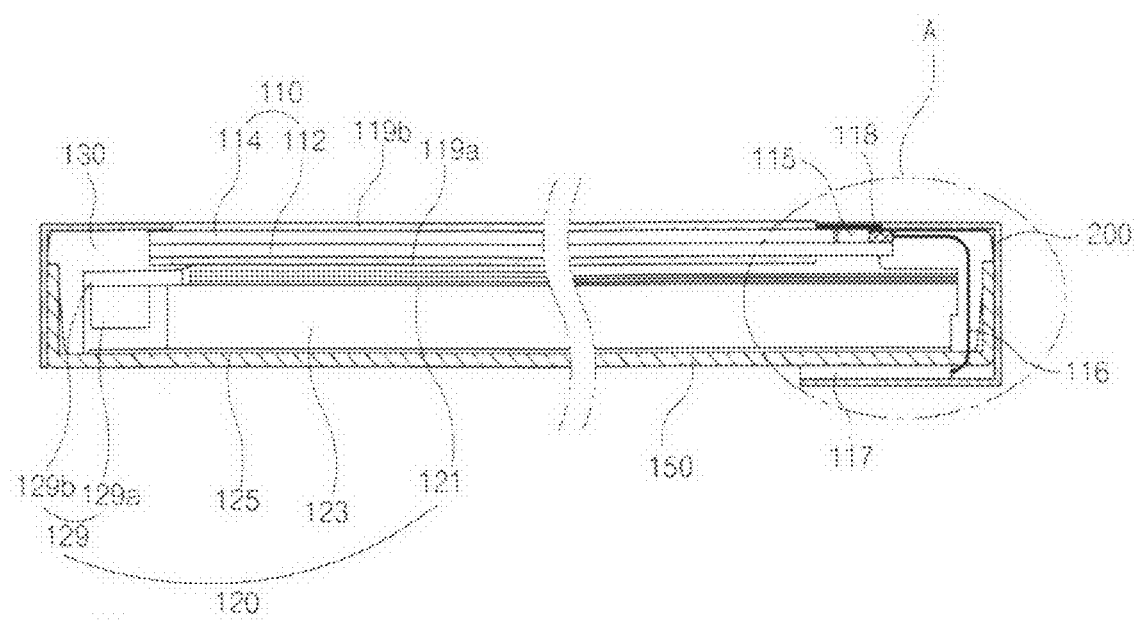
FIG. 4A is a cross-sectional view of the LCD module of FIG. 2.
Figure 4B:
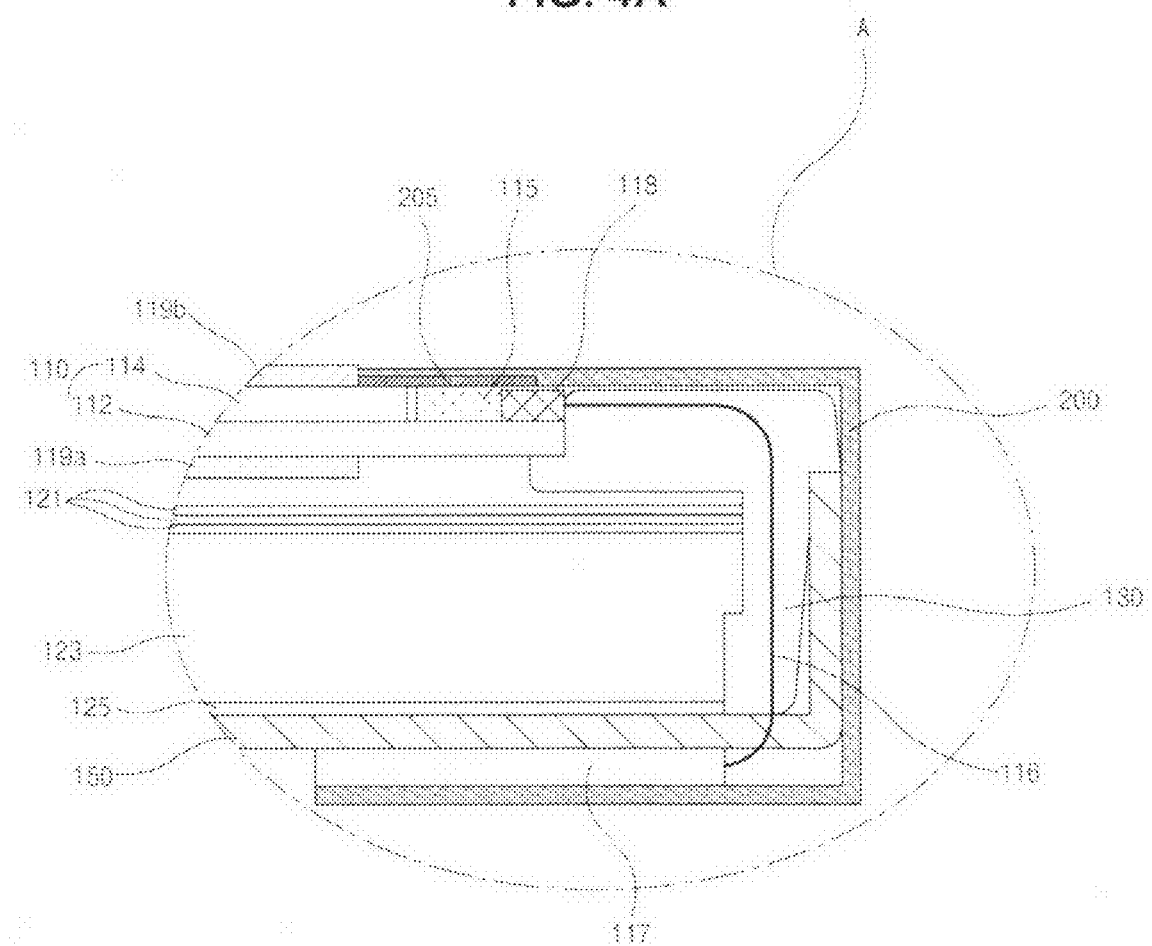
FIG. 4B is a view enlarging an area A of FIG. 4A.

FIG. 4A is a cross-sectional view of the LCD module of FIG. 2, and FIG. 4B is a view enlarging an area A of FIG. 4A.

In FIG. 4A and FIG. 4B, the reflection sheet 125, the light guide plate 123, the LED assembly 129 at the side of the liquid guide plate 123, and the plurality of optical sheets 121 over the light guide plate 123 are sequentially disposed to constitute the backlight unit 120.

The liquid crystal panel 110 including the first and second substrates 112 and 114 and the liquid crystal layer (not shown) interposed therebetween is disposed over the backlight unit 120. First and second polarizers 119a and 119b are disposed at outer surfaces of the first and second substrates 112 and 114, respectively. The first and second polarizers 119a and 119b selectively transmit light polarized in a certain direction.

As stated above, the second substrate 114 has a smaller size than the first substrate 112 and exposes the edge portion of the first substrate 112. Even though not shown in the figures, adjacent edges portions of the first substrate 112 are exposed. The driving circuit 115 is mounted in the edge portion of the first substrate 112 by the COG method. The upper surface of the driving circuit 115 is treated to block the static electricity.

The printed circuit board 117 is connected to the driving circuit 115 through the connection means 116 and is bent toward the side surface of the support main 130 or the rear surface of the cover bottom 150.

The side surfaces of the backlight unit 120 and the liquid crystal panel 110 are surrounded by the support main 130, and the cover bottom 150 is combined with the support main 130.

The adhesive tape 200 covers the side surfaces and the edge portions of the upper surface of the liquid crystal panel 110 and the side surfaces of the support main 130. The adhesive tape 200 extends onto the rear surface of the cover bottom 150. The backlight unit 120, the liquid crystal panel 110, the support main 130 had the cover bottom 150 are combined together by the adhesive tape 200 to constitute one-united module.

Here, the adhesive tape 200 is attached and fixed to the upper surface and the side surface of the liquid crystal panel 110, the side surface of the support main 130, and the rear surface of the cover bottom 150 through the adhesive material layer 203 of FIG. 3.

Accordingly the adhesive tape 200 covers and protects the printed circuit board 117, which is bent toward the side surface of the support main 130 or the rear surface of the cover bottom 150, from the outside.

At this time, the adhesive tape 200 does not cover the second polarizer 119b, and thus the thickness of the LCD module can be decreased by the thickness of the second polarizer 119b.

Here, the conductive metallic layer 205, which is formed on an inward edge of a lower surface of the adhesive tape 200, partially contacts an edge portion of the outer surface of the second substrate 114 of the liquid crystal panel 110 and also contacts the upper surface of the driving circuit 115 on the first substrate 112 of the liquid crystal panel 110.

According to this, the liquid crystal panel 110 and the driving circuit 115 are grounded to the outside through the conductive metallic layer 205 of the adhesive tape 200, and the static electricity created in the liquid crystal panel 110 and the driving circuit 115 are removed. Therefore, various signals for operating the liquid crystal panel 110 and the driving circuit 115 are prevented from being interfered with the static electricity.

Meanwhile, a protection pad 118 may be further formed at a side of the driving circuit 115 on the first substrate 112 such that the conductive metallic layer 205 of the adhesive tape 200 does not directly contact the pad area of the first substrate 112.

That is, copper patterns (not shown) for mounting the driving circuit 115 are formed in the pad area of the first substrate 112. If the conductive metallic layer 205 contacts the patterns, there may occur electrical shocks, and this may cause abnormal operations. Therefore, the conductive metallic layer 205 is prevented from contacting the pad area of the first substrate 112.

When adhesive tape 200 is attached to the liquid crystal panel 120 by hand of an operator, the conductive metallic layer 205 of the adhesive tape 200 may contact the pad area of the first substrate 112 of the liquid crystal panel 110. To prevent this beforehand, the protection pad 118 is further formed at the side of the driving circuit 115, that is, in the pad area of the first substrate 112.

The protection pad 118 may include a PET resin layer and an adhesive material layer, and the protection pad 118 does not have a conductive property.

Table 1 shows operating properties of LCD modules with and without a static electricity-shielding structure according to the present invention and the related art. That is, the LCD module of the related art does not include the static electricity-shielding structure such as the conductive metallic layer 205 of the adhesive tape 200 of FIGS. 4A and 4B. The LCD module of the present invention includes the static electricity-shielding structure such as the conductive metallic layer 205 of the adhesive tape 200 of FIGS. 4A and 4B.

TABLE 1

| classification | | | data | | | | | |
|---|---|---|---|---|---|---|---|---|
| related art | module 1 | voltage | 8 kV | 9 kV | 17 kV | 18 kV | 19 kV | 25 kV |
| | | grade | B | D | — | — | — | — |
| | module 2 | | B | D | — | — | — | — |
| present invention | module 1 | voltage | 15 kV | 16 kV | 17 kV | 18 kV | 19 kV | 25 kV |
| | | grade | B | B | B | B | B | B |
| | module 2 | | B | B | B | B | B | C |

Here, grade B means the state of the LCD module that instantly abnormally operates and normally operates at once. Grade C means the state of the LCD module that abnormally operates for a considerable time and then normally operates. Grade D means the state of the LCD module that completely abnormally operates.

From Table 1, the LCD module of the related art abnormally operates when a static electricity testing voltage of 9 kV is applied to the module. More particularly, when the static electricity of more than 9 kV occurs in the LCD module, the static electricity affects the arrangement of the liquid crystal molecules in the liquid crystal panel and impedes a normal operation, and the driving circuits are damaged.

On the other hand, in the present invention, since the static electricity of the liquid crystal panel 110 and the driving circuit 115 is removed through the adhesive tape 200, the LCD module of the present invention normally operates even if the static electricity of more than 19 kV is applied to the module.

As mentioned above, the adhesive tape 200 covers the side surfaces and the edge portions of the upper surface of the liquid crystal panel 110 and extends to the side portions of the support main 130. The adhesive tape 200 enables the liquid crystal panel 110, the support main 130 and the cover bottom 150 to be one-united module. Accordingly, the related art top cover can be omitted, and the LCD module can have a thin thickness. In addition, the process is simplified, and it is easy to reassemble the module.

At this time, in the LCD module including the liquid crystal panel 110 on which the driving circuits 115 are mounted by the COG method, the adhesive tape 200 further includes the conductive metallic layer 205 contacting the liquid crystal panel 110 and the driving circuit 115. Therefore, the static electricity created in the liquid crystal panel 110 and the driving circuit 115 is grounded to the outside through the conductive metallic layer 205 of the adhesive tape 200 and is removed.

The above-mentioned backlight unit 120 has the LED assembly 129 at a side of the light guide plate 123, which may be referred to as a side light type, and the LED assembly 129 may be disposed at each of opposite sides of the light guide plate 123 inside of both sides of the support main 130 facing each other along a length direction.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a cover bottom;
   a support main over the cover bottom;
   a backlight unit surrounded by the support main;
   a liquid crystal panel over the backlight unit and including first and second substrates with a liquid crystal layer interposed therebetween;
   a driving circuit on an edge portion of the first substrate;
   a printed circuit board connected to the driving circuit through a connection means and bent toward one of a side surface of the support main and a rear surface of the cover bottom; and
   an adhesive tape covering edges of a front surface of the liquid crystal panel and including a conductive layer contacting the liquid crystal panel and the driving circuit,
   wherein the conductive layer is electrically connected to one of the cover bottom and the printed circuit board.

2. The device according to claim 1, further comprising a protection pad at a side of the driving circuit.

3. The device according to claim 1, wherein the adhesive tape includes first, second, third and fourth parts and has a rectangular frame shape.

4. The device according to claim 3, wherein the conductive layer is formed on an inward portion of the first part along a length direction of the first part and has a wider width than the driving circuit.

5. The device according to claim 4, wherein the first part of the adhesive tape is partially wider than the third and fourth parts of the adhesive tape.

6. The device according to claim 4, wherein the first part of the adhesive tape extends onto the rear surface of the cover bottom.

7. The device according to claim 6, wherein the first part of the adhesive tape covers the printed circuit board.

8. The device according to claim 1, wherein the conductive layer corresponds to a side of the liquid crystal panel connected to the printed circuit board.

9. The device according to claim 1, wherein the conductive layer includes aluminum.

10. The device according to claim 1, wherein the adhesive tape includes a base film of a polyethylene terephthalate (PET) resin and an adhesive material layer.

* * * * *